UNITED STATES PATENT OFFICE.

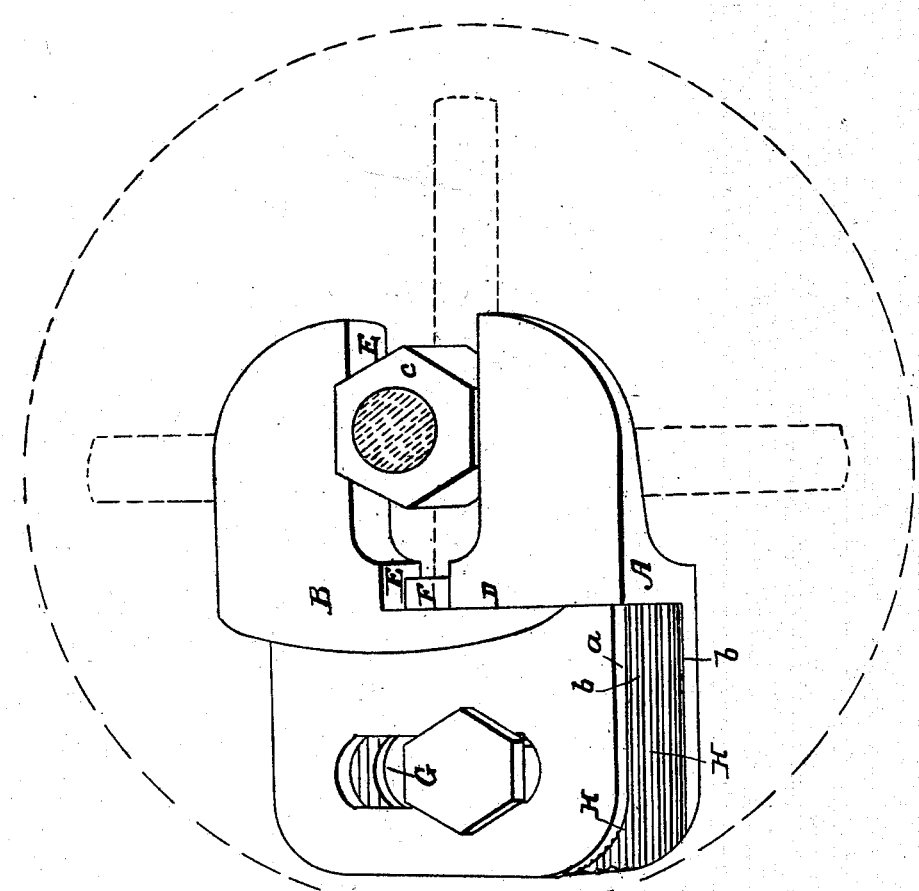

WILLIAM VINE, OF NORWALK, CONNECTICUT.

DOG FOR LATHES.

Specification forming part of Letters Patent No. 49,180, dated August 1, 1865.

*To all whom it may concern:*

Be it known that I, WILLIAM VINE, of the town of Norwalk, county of Fairfield, and State of Connecticut, have invented a new and useful Improvement in the Mode of Constructing Dogs for the Use of Lathes for Turning up Bolt-Heads and other articles; and I do hereby declare that the following is a correct description of the same, reference being had to the accompany drawing, and to the letters of reference marked thereon.

The nature of my invention consists in the arrangement of two angular or Z-shaped plates with corrugations or teeth on the faces, so that the jaws or openings can be adjusted to receive between them any sized bolt-head.

To enable others skilled in the art to make and use my invention, I will proceed to describe its construction and operation.

In the drawing, Figure 1 is a view of the dog when placed on the face-plate of a lathe for operation.

In turning and facing up the heads of machine-bolts the usual manner is to have a dog for each sized bolt-head composed in one piece of boiler-plate or thin wrought-iron made to the required width between the jaws to receive the bolt-head, and the sizes of which are so various that it requires an endless number of single dogs to suit the different heads, being a matter sometimes of great inconvenience as well as expense.

The object of this my present invention is to have an adjustable dog to accommodate itself to any sized head or any other article for which it may be suitable.

The drawing attached to this specification will explain the general formation of the two Z-shaped plates which I compose of maleable iron as a matter of economy, and, if necessary, some parts may be case-hardened.

The lower plate, A, is placed on next to the face-plate, and the upper one, B, is placed on A, each being made to form half the jaws E to hold the bolt-head $c$ between them. The upper one, B, is made shorter the thickness of the bottom part of A, so that they will both be level and even on the top face, D, the lower plate, A, being sunk down at F for the upper half of the jaw E to slide on when being adjusted. Each plate has a slot, G, for a bolt to pass through to fasten the whole to the face-plate.

On each of the two connecting-faces at $a$ and $b$ of A and B, I form corrugations or teeth H to match into each other, so that when they are placed together and bolted tight on the face-plate they are immovable and nearly equal in strength to solid iron.

The ribs and projections on both plates are to give strength to the article without adding much to the weight.

The way to use this dog is very simple. Lift the upper half, B, out of the teeth $a$, then set the jaws the proper distance apart to suit the size of the head of the bolt, then bolt the two through the slots G to the face-plate in the same manner as a single dog.

There are no limits to the size or strength of the dog for small bolts or large ones.

What I claim as my invention, and desire to secure by Letters Patent, is—

1. The arrangement of the two adjustable plates, A and B, in the manner and for the purpose substantially as herein described.

2. The arrangement of the corrugated faces, or their equivalent, substantially as set forth

WM. VINE.

Witnesses:
 GEO. VINE,
 A. W. VINE.